United States Patent [19]
Wollscheid

[11] Patent Number: 4,592,010
[45] Date of Patent: May 27, 1986

[54] MEMORY-PROGRAMMABLE CONTROLLER

[75] Inventor: Dieter Wollscheid, Erlangen, Fed. Rep. of Germany

[73] Assignee: Siemens Aktiengesellschaft, Munich, Fed. Rep. of Germany

[21] Appl. No.: 568,107

[22] Filed: Jan. 4, 1984

[30] Foreign Application Priority Data

Jul. 1, 1983 [DE] Fed. Rep. of Germany ....... 3323824

[51] Int. Cl.$^4$ .................. G06F 13/10; G06F 15/46
[52] U.S. Cl. .................................................. 364/900
[58] Field of Search ... 364/200 MS File, 900 MS File

[56] References Cited

U.S. PATENT DOCUMENTS

| | | | |
|---|---|---|---|
| 3,810,118 | 5/1974 | Kiffmeyer | 364/200 |
| 3,921,146 | 11/1975 | Danco | 364/200 |
| 3,942,158 | 3/1976 | Dummermuth | 364/900 |
| 4,165,534 | 8/1979 | Dummermuth et al. | 364/900 |
| 4,175,284 | 11/1979 | Shuraym | 364/200 |
| 4,180,862 | 12/1979 | Seipp | 364/900 |
| 4,245,307 | 1/1981 | Kapeghian et al. | 364/200 |
| 4,282,584 | 8/1981 | Brown et al. | 364/900 |
| 4,293,924 | 10/1981 | Struger et al. | 364/900 |
| 4,455,621 | 6/1984 | Pelley et al. | 364/900 |
| 4,484,303 | 11/1984 | Provanzano et al. | 364/900 |
| 4,517,657 | 5/1985 | Schwefel | 364/900 |

Primary Examiner—James D. Thomas
Assistant Examiner—William G. Niessen
Attorney, Agent, or Firm—Kenyon & Kenyon

[57] ABSTRACT

A memory programmable controller of the multiprocessor type having both word and bit processors is disclosed. The controller has a data memory in which process images of the process being controlled are stored and a user program memory in which a control program is stored. In order to increase the rate at which commands are executed by the controller, means are employed by which the bit processor fetches commands from the user program memory at the same time that it is executing a prior command. Accordingly, two sequential commands are respectively executed and fetched simultaneously, thereby increasing the speed of the controller. Separate bus systems dedicated to the bit processor which enable the bit processor to access the user program memory and the data memory are employed.

4 Claims, 2 Drawing Figures

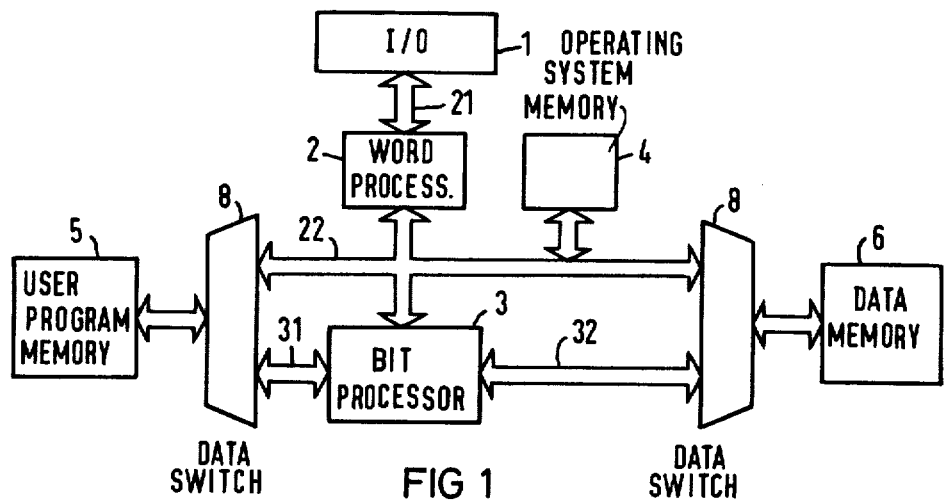
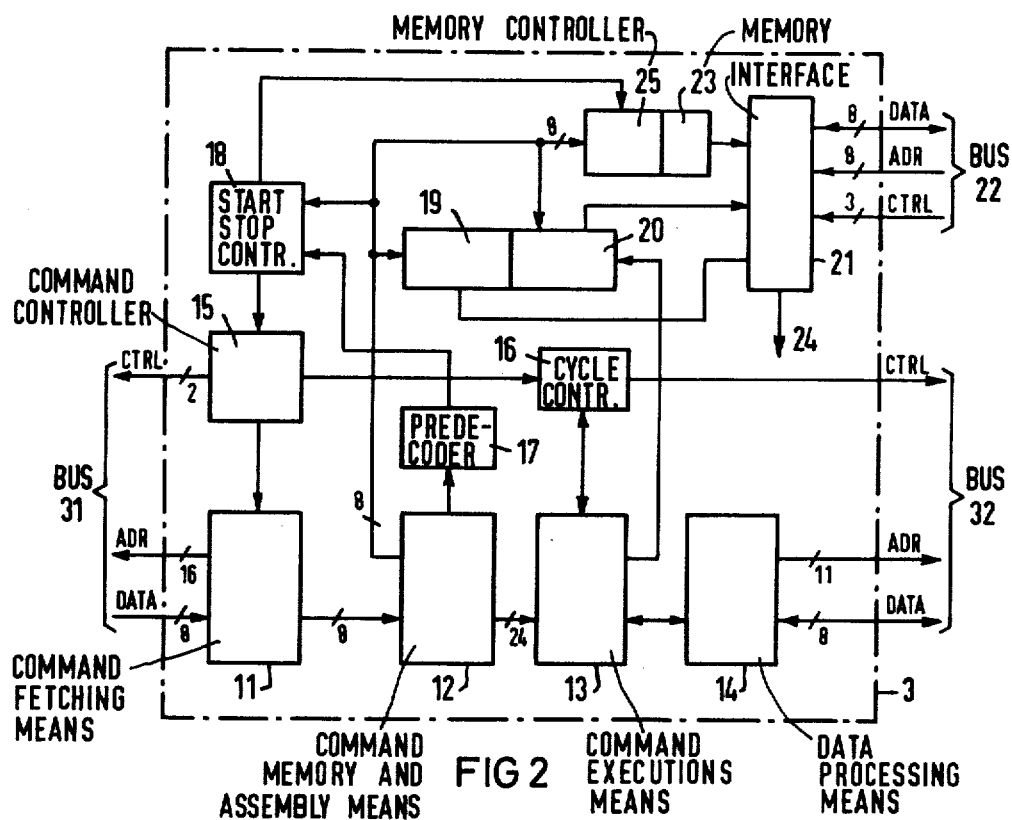

MEMORY-PROGRAMMABLE CONTROLLER

CROSS REFERENCE TO RELATED APPLICATIONS

This application is related to the following U.S. Patent Applications, each of which was filed on even date herewith and assigned to the assignee of the present application:

Memory-Programmable Controller, filed as Ser. No. 568,104 on Jan. 4, 1984 in the names of Peter Ninnemann and Dieter Wollscheid, and claiming priority of German Application No. P33 02 902.4 filed Jan. 28, 1983;

Memory-Programmable Controller, filed as Ser. No. 568,106 on Jan. 4, 1984 in the names of Peter Ninnemann and Dieter Wollscheid, and claiming priority of German Application No. P33 02 929.6 filed Jan. 28, 1983;

Memory-Programmable Controller with Word and Bit Processors, filed as Ser. No. 568,105 on Jan. 4, 1984 in the names of Peter Ninnemann and Dieter Wollscheid, and claiming priority of German Application No. P33 02 940.2 filed Jan. 28, 1983;

Memory-Programmable Controller, filed as Ser. No. 568,115 on Jan. 4, 1984 in the names of Dieter Wollscheid, Peter Ninnemann, Siegfried Stoll and Waldemar Wenzel, and claiming priority of German Application No. P33 02 909.1 filed Jan. 28, 1983.

The disclosures of each of the above applications is hereby incorporated by reference.

BACKGROUND OF THE INVENTION

The present invention relates to the field of memory-programmable controllers of the type having cyclically traversed user control programs for controlling peripheral processes. In particular the present invention relates to memory-programmable controllers of the multi-processor type having a word processor for processing operating system and word commands, a bit processor for processing binary interlinking commands, a user program memory in which the control program is stored, an operating system memory in which an operating system program is stored and a data memory wherein binary process images of the peripheral process under control are stored.

Memory-programmable controllers are described in detail, for instance, in Siemens Zeitschrift "Energietechnik" 1979, no. 2, pages 43 to 47 no. 4, pages 136 to 139 in European Patent No. 10170 and in U.S. Pat. Nos. 3,921,146 and 3,942,158.

A memory-programmable controller of the type mentioned above should preferably be able to carry out the logical interlinking of data 1-bit wide as well as more complex functions with data one word wide, such as arithmetic functions, data transfer, timing etc.

It is therefore advantageous to use within the scope of a memory programmable controller a multiprocessor system, in which the execution of binary commands is assigned to a separate bit processor, while a relatively slow word processor which processes bits in parallel can carry out more complex functions (see, for instance, Siemens Zeitschrift "Energietechnik" 1980, no. 9, page 361).

An essential criterion for a memory-programmable controller is that it process word and bit commands rapidly. In particular the bit processor must be able to process commands rapidly.

SUMMARY OF THE INVENTION

It is an object of the present invention to provide a memory programmable controller having a fast bit processor.

This and other objects of the present invention are achieved in a memory programmable controller of the type having a cyclically traversed user control program for controlling a peripheral process, including a word processor for processing operating system and word commands, a word processor bus coupled to the word processor, a bit processor for processing binary interlinking commands, a user program memory wherein the control program including the word commands and interlinking commands is stored, an operating system memory wherein an operating system program including the operating system commands is stored and a data memory wherein binary process images of the process are stored, the improvement comprising the bit processor including:

means for executing a first binary interlinking command from the user program memory;

first bus means;

means coupled to the bus means for fetching from the user program memory the next command via the bus means;

second bus means for accessing data from the data memory when the first command is being executed; and means for preparing the next command and the data for execution by said means for executing immediately after the first command is executed.

Thus, in order to increase the command throughput rate, the loading of the command and the execution of the preceding command are carried out in parallel. Due to the low complexity of the commands carried out by the bit processor and the short times for command decoding and internal command execution in connection therewith, the memory access time is the primary factor in determining the command throughput rate. For this reason, the user program memory and the data memory of the bit processor are coupled via separate bus systems.

If, when executing commands in the user program memory, the bit processor recognizes a word command, it goes into a waiting state and furnishes information characterizing the word command to the word processor.

Since data communication between the controller and the peripheral process is performed via the word processor and the latter must therefore also process asynchronous events arriving from the peripheral process, the word processor controls the bit processor, and specifically in the manner of a programmable peripheral module which can be started and stopped and the command address register of which can be manipulated by the word processor. Since access to control and status registers of the bit processor must be possible even when the bit processor is loading and executing commands a third bus connection, namely, to the word processor bus, is required for the bit processor.

BRIEF DESCRIPTION OF THE DRAWINGS

The invention will be described in greater detail in the following detailed description with reference to the drawings in which:

FIG. 1 is a block diagram of one embodiment of the memory-programmable controller according to the invention; and FIG. 2 is a more detailed block diagram of one embodiment of the bit processor of the controller of FIG. 1.

DETAILED DESCRIPTION

With reference now to the drawings, the user control program resides in a user program memory 5 which may be designed as a read/write memory or as a read-only memory (ROM). This memory can be organized, for instance, as $2^{16} \times 8$ bits and can be addressed via sixteen address lines and may have eight data lines as well as the required control lines for controlling reading and writing, etc.

The data to be processed, i.e., the process images, reside in a data memory 6 which is designed as a read/write memory and is organized for instance, as $2^9 \times 8$ bits.

The controller includes a word processor 2 and a bit processor 3. The word processor, as a rule a standard microprocessor, has the following tasks:

1. Executing special commands in the user program which are not contained in the operational store of the bit processor, i.e., word commands, for instance, the processing of counting arithmetic and timing functions.

2. Transfer of programs in the user program memory and of data in the data memory from and to programming and testing devices.

3. Transfer of data in the data memory from and to the peripheral process (input and output of the process images).

4. Diagnostic and servicing functions.

As may be seen from FIG. 1, the word processor 2 is coupled to a peripheral bus 21, to which the input and output modules 1 coupled to the controlled process are connected. Furthermore, an internal system bus 22 (word processor bus), couples the operating system memory 4 and, via data switches 8, the user program memory 5 and the data memory 6 wherein the process images are stored. The bit processor 3 is also connected to the bus 22. Bit processor 3 also accesses the user program memory 5 and data memory 6 but only via dedicated buses 31 and 32 and the respective data switches 8. Data communication with the peripheral process is always via the word processor 2 which stores at the control program cycle limits the status of all input information from the process in the internal data memory 6 and transmits the output signals resulting from the logic stored in the data memory 6 to the peripheral process at the end of the cycle. During the execution of the control program, the controller therefore does not operate directly with the actual signals of the peripheral process, but rather with the internal process images in the data memory 6. See e.g. U.S. Pat. Nos. 3,921,146 and 3,942,158 The control program, i.e., the instructions for executing the bit and word operations, are encoded in a special programming language and are stored in the user program memory 5. These instructions are executed by the bit processor 3 directly and by the word processor 2 in certain routines.

These routines as well as other operating system routines are permanently stored in the operating system memory 4 of the word processor 2 in the language of the microprocessor used for the word processor.

As essential criterion of the above-described controller is that commands be executed rapidly. Therefore, fast coupling of the two processors as well as a fast command throughput in the bit processor are extremely important.

As already noted, the commands in the user program memory are as a rule executed by the bit processor itself. However, some of the commands i.e., word commands, must be transferred to the word processor for execution.

A binary logic command may comprise, for instance, three words of 8 bits each.

The bit processor 3 includes a command address register which points to a word in the user memory. To execute a command, three successive words are loaded into the bit processor. If a complete command is in the bit processor, it is either executed directly, access being made to the data memory 6 for the data on which the commands operate, or the command is transferred to the word processor 2.

The structure of the bit processor is shown in FIG. 2. As is evident from FIG. 2, the commands are executed internally by several means which operate in parallel.

The command-fetching means 11 continuously loads user program memory words according to the control commands of the command controller 15, from user program memory 5 via one data switch 8 and bus 31 into the command memory and assembly means 12. While the means 11 loads commands, the previous command is executed in the command execution means 13 independently of the loading of the new command. Means 13 accesses the data memory 6 for the data on which the command operates via the bus 32 and the data processing means 14.

The two separate buses 31 and 32 thus make the independence of command fetching and command execution possible.

As already noted, means 12 assembles a command word from several words from the program memory 5. If such a command is assembled, it is immediately transferred to the command execution means 13. At the same time, the cycle controller 16 is triggered. The command execution means 13 then processes the command, wherein it accesses the data in the data memory 6 via the data processing means 14. The data are stored in the data memory in words of 8 bits each. The width corresponds as a rule to the data bus width of the word processor. It should be chosen as large as possible so as to make the transfer of data from and to the peripheral process fast enough, since, a relatively slow transmission channel is typically used for such transfer. Since, however, the data are handled by the bit processor bit by bit, a word must first be read from the data memory 6, processed in the bit processor and subsequently written into the data memory 6 again for each write process of an individual bit. This task is performed by the data processing means 14 which is also responsbile for the indexing of commands, i.e., a possible substitution of the data memory address.

A predecoder 17 is associated with the command assembly means 12. The predecoder determines whether a binary logic or interlinking command is read from memory 5. If a binary logic command is not present, but rather a word command is read, the bit processor is shut down via the start-stop controller 18. The word command is not transferred directly to the word processor, but serves as the entry address for the program routine in the operating system memory 4 associated with a given word processor operation. For this purpose, a memory controller 25 addressed by the command memory and assembly means 12 corresponding to the present word command is provided, which generates from the code of the word operation the address for a given storage cell of the associated memory 23. Memory 23, which may also be located externally of the bit processor 3, is continuously interrogated by the word processor via bus 22. The word processor 2 finds at the addressed storage cell of the memory 23 the entry address of the program routine in memory 4 required for the execution of the word command. It is achieved in this manner that, with a fixed command code of the word operation, the entry addresses into the associated program routines can be kept variable.

Memory 23 can optionally be dispensed with. In such case, memory 23 is replaced by a data block within the operating system memory 4, in which the entry address is determined by means of a table lookup procedure. In the simplest case, the entry address can also be determined directly from the output data of the memory controller 25 by arithmetical and logical operations.

The bit processor is further coupled to the word processor bus 22 via interface 21. The bit processor processes a program independently and is treated by the word processor like any other peripheral device. The internal state of the bit processor can, for instance, be controlled by a control input 19, for instance, start-stop, and the internal state of the bit processor can be interrogated via a status input 20. Furthermore, some internal registers of the bit processor such as the command address register and other binary registers, can be controlled by the word processor via interface 21, as indicated by arrow 24.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than a restrictive sense.

What is claimed is:

1. In a memory-programmable controller of the type having a cyclically traversed user control program for controlling a peripheral process, including a word processor for processing operating system and word commands, a word processor bus coupled to the word processor, a bit processor for processing binary interlinking commands, a user program memory wherein the control program including the word and interlinking commands is stored, an operating system memory wherein an operating system program including the operating system commands is stored and a data memory wherein binary process images of the process are stored, the improvement comprising the bit processor being coupled to the word processor bus and including:
means for executing a first binary interlinking command from the user program memory;
first bus means;
means coupled to said first bus means for fetching from the user program memory a next binary interlinking or word command via said first bus means;
second bus means;
data processing means coupled to said second bus means and to said means for executing;
said second bus means allowing said data processing means to access data from said data memory when said first command is being executed; and
means coupled to said means for fetching for assembling said next command and for transferring the next command to said means for executing if said next command is a binary interlinking command, thereby allowing said means for executing to process data from said data memory in accordance with said next command immediately after the first command is executed.

2. The improvement recited in claim 1 wherein said means for assembling comprises means for determining whether a word command has been read by said means for fetching and means responsive to the presence of a word command for stopping the bit processor, said means for determining further comprising means for generating digital information identifying the word command and means for coupling said digital information to the word processor so that said word processor can execute said word command.

3. The improvement recited in claim 2 wherein said means for stopping is further responsive to a control signal from said word processor for restarting said bit processor after said word processor has executed a word command.

4. The improvement recited in claim 1 further comprising at least one data storage means, said data storage means being coupled to said word processor bus, said word processor having access to said data storage means over said word processor bus for reading from and writing into said data storage means.

* * * * *